United States Patent [19]
Youngs

[11] Patent Number: 6,086,117
[45] Date of Patent: Jul. 11, 2000

[54] DOUBLE BOOTED FLEXIBLE ENTRY BOOT

[75] Inventor: Andrew Youngs, Granger, Ind.

[73] Assignee: Advanced Polymer Technology, Inc., Muskegon, Mich.

[21] Appl. No.: 09/073,184

[22] Filed: May 5, 1998

Related U.S. Application Data

[60] Provisional application No. 60/060,329, Sep. 29, 1997.

[51] Int. Cl.[7] .............................. F16L 5/00; F16L 41/14; F16L 3/04

[52] U.S. Cl. ......................... 285/205; 285/207; 285/236; 285/215; 277/606

[58] Field of Search ..................................... 285/205, 206, 285/207, 208, 215, 216, 236; 277/606, 607, 636; 16/2.2; 248/56

[56] References Cited

U.S. PATENT DOCUMENTS

| | | |
|---|---|---|
| D. 309,308 | 7/1990 | Webb . |
| D. 313,418 | 1/1991 | Webb . |
| D. 322,970 | 1/1992 | Webb . |
| 845,760 | 3/1907 | Coffin . |
| 1,317,260 | 9/1919 | Armstrong . |
| 1,582,191 | 4/1926 | Snooke . |
| 1,639,495 | 8/1927 | Frame . |
| 1,712,510 | 5/1929 | Monie . |
| 1,793,038 | 2/1931 | Zimmermann . |
| 2,151,770 | 3/1939 | James . |
| 2,254,668 | 9/1941 | Tomek . |
| 2,310,877 | 2/1943 | Sperry . |
| 2,336,150 | 12/1943 | Horvath . |
| 2,366,442 | 1/1945 | Cunningham ........................... 285/205 |
| 2,382,489 | 8/1945 | Koppel .................................... 285/205 |
| 2,410,999 | 11/1946 | Reisner . |
| 2,441,009 | 5/1948 | Cunningham . |
| 2,449,229 | 9/1948 | Hopwood . |
| 2,671,573 | 3/1954 | Hendon et al. . |
| 2,688,497 | 9/1954 | Brisack . |
| 2,691,538 | 10/1954 | Clausen . |

(List continued on next page.)

FOREIGN PATENT DOCUMENTS

| | | |
|---|---|---|
| 150132 | 5/1951 | Australia . |
| 200618 | 10/1955 | Australia . |
| 1068961 | 1/1980 | Canada . |
| 2047354 | 1/1992 | Canada . |

(List continued on next page.)

OTHER PUBLICATIONS

Hofit, *Instructions for the Installation of Hofit Chambers*, pp. A1/17–A17/17.

Owens–Corning Fiberglas, *Piping Sumps—For Secondary Containment of Pumps & Piping (Installation & Specification)*, pp. 1–9 (Dec. 1985).

(List continued on next page.)

*Primary Examiner*—Eric K. Nicholson
*Attorney, Agent, or Firm*—Young & Basile, P.C.

[57] ABSTRACT

A double booted flexible entry boot provides a fluid-tight fitting between a wall of a fluid containment region and a conduit passing through the wall. An inner seal member is disposed within the containment region, and a first securing plate is disposed within the containment region and mounted to the inner seal member. A first flexibly rigid, hollow support sleeve extends outwardly from the inner seal member, and a mechanism releasably attaches the first hollow support sleeve to the conduit. An outer seal member is disposed outside of the containment region, and a second securing plate is disposed outside of the containment region and mounted to the outer seal member. A second flexibly rigid, hollow support sleeve extends outwardly from the outer seal member and opposedly from the first hollow support sleeve, the first and second support sleeves having a degree of flexibility sufficient to allow for the insertion of the conduit at angles equal to or other than an angle normal to the fluid containment wall while maintaining a fluid-tight environment. A mechanism releasably attaches the second hollow support sleeve to the conduit. A mechanism, carried by the second securing plate, releasably attaches the inner seal member to the wall of the containment region. The inner seal member may be repaired or replaced without substantial outside fluid invading the containment region.

20 Claims, 4 Drawing Sheets

U.S. PATENT DOCUMENTS

| | | |
|---|---|---|
| 2,717,792 | 9/1955 | Pelley . |
| 2,813,692 | 11/1957 | Bremer et al. . |
| 2,870,881 | 1/1959 | Rogge . |
| 2,906,500 | 9/1959 | Knapp et al. . |
| 2,911,001 | 11/1959 | Fuller . |
| 3,010,598 | 11/1961 | Foss . |
| 3,098,663 | 7/1963 | Dibley . |
| 3,178,206 | 4/1965 | Martin et al. . |
| 3,243,240 | 3/1966 | Arthur . |
| 3,362,425 | 1/1968 | Morris et al. . |
| 3,389,560 | 6/1968 | Zemsky . |
| 3,390,224 | 6/1968 | Wyatt . |
| 3,401,958 | 9/1968 | Demyon . |
| 3,408,778 | 11/1968 | Mason . |
| 3,423,518 | 1/1969 | Weagant . |
| 3,439,837 | 4/1969 | Hearn et al. . |
| 3,459,229 | 8/1969 | Croft . |
| 3,518,359 | 6/1970 | Trimble et al. . |
| 3,531,264 | 9/1970 | Greipel . |
| 3,543,377 | 12/1970 | Bremner . |
| 3,615,034 | 10/1971 | Lemelson . |
| 3,654,382 | 4/1972 | Rubright . |
| 3,707,852 | 1/1973 | Burckhardt et al. . |
| 3,712,009 | 1/1973 | Campagna . |
| 3,715,958 | 2/1973 | Crawford et al. . |
| 3,721,270 | 3/1973 | Wittgenstein . |
| 3,759,280 | 9/1973 | Swanson . |
| 3,802,456 | 4/1974 | Wittgenstein . |
| 3,858,752 | 1/1975 | Marvin, Jr. et al. . |
| 3,859,802 | 1/1975 | Platner et al. . |
| 3,882,976 | 5/1975 | Nash . |
| 3,905,405 | 9/1975 | Fowler et al. . |
| 3,938,285 | 2/1976 | Gilbu . |
| 3,972,440 | 8/1976 | Warren . |
| 3,995,332 | 12/1976 | Forchini et al. . |
| 3,997,760 | 12/1976 | Salinger . |
| 4,062,376 | 12/1977 | McGrath . |
| 4,076,040 | 2/1978 | Alpers et al. . |
| 4,082,301 | 4/1978 | Salinger . |
| 4,089,139 | 5/1978 | Moffa et al. . |
| 4,109,976 | 8/1978 | Koch . |
| 4,132,083 | 1/1979 | McGrath . |
| 4,145,075 | 3/1979 | Holzmann . |
| 4,182,581 | 1/1980 | Uehara et al. . |
| 4,215,868 | 8/1980 | Skinner et al. . |
| 4,230,234 | 10/1980 | Taylor . |
| 4,249,758 | 2/1981 | Harris . |
| 4,262,166 | 4/1981 | Radzishevsky et al. . |
| 4,275,757 | 6/1981 | Singer . |
| 4,291,905 | 9/1981 | Schrock . |
| 4,309,128 | 1/1982 | Williams . |
| 4,327,925 | 5/1982 | Alexander et al. . |
| 4,342,462 | 8/1982 | Carlesimo ................................ 277/606 |
| 4,365,829 | 12/1982 | Fowler . |
| 4,387,900 | 6/1983 | Ditcher et al. . |
| 4,449,715 | 5/1984 | Gagas . |
| 4,449,853 | 5/1984 | Mennella et al. . |
| 4,472,911 | 9/1984 | Jooris et al. . |
| 4,492,392 | 1/1985 | Woods et al. . |
| 4,512,148 | 4/1985 | Jacobson . |
| 4,530,443 | 7/1985 | Gorges . |
| 4,540,310 | 9/1985 | Ditcher et al. . |
| 4,552,386 | 11/1985 | Burchette . |
| 4,568,925 | 2/1986 | Butts . |
| 4,619,555 | 10/1986 | Skinner et al. . |
| 4,621,941 | 11/1986 | Ditcher et al. . |
| 4,639,164 | 1/1987 | Pugnale et al. . |
| 4,659,251 | 4/1987 | Petter et al. . |
| 4,667,505 | 5/1987 | Sharp . |
| 4,685,327 | 8/1987 | Sharp . |
| 4,696,330 | 9/1987 | Raudman et al. . |
| 4,702,645 | 10/1987 | Skinner et al. . |
| 4,709,723 | 12/1987 | Sidaway et al. . |
| 4,711,365 | 12/1987 | Fomby . |
| 4,714,095 | 12/1987 | Muller et al. . |
| 4,717,036 | 1/1988 | Dundas et al. . |
| 4,731,501 | 3/1988 | Clark et al. . |
| 4,747,453 | 5/1988 | Howard, Sr. . |
| 4,763,806 | 8/1988 | Podgers et al. . |
| 4,767,108 | 8/1988 | Tanaka et al. . |
| 4,770,317 | 9/1988 | Podgers et al. . |
| 4,770,562 | 9/1988 | Muller et al. . |
| 4,775,073 | 10/1988 | Webb . |
| 4,782,430 | 11/1988 | Robbins et al. . |
| 4,797,513 | 1/1989 | Ono et al. . |
| 4,805,444 | 2/1989 | Webb . |
| 4,809,866 | 3/1989 | Crocker . |
| 4,870,856 | 10/1989 | Sharp . |
| 4,871,084 | 10/1989 | Robbins . |
| 4,890,863 | 1/1990 | Westhoff et al. . |
| 4,896,705 | 1/1990 | Podgers et al. . |
| 4,905,940 | 3/1990 | Luka . |
| 4,912,287 | 3/1990 | Ono et al. . |
| 4,924,923 | 5/1990 | Boehmer et al. . |
| 4,928,349 | 5/1990 | Oikawa et al. . |
| 4,932,257 | 6/1990 | Webb . |
| 4,958,957 | 9/1990 | Berg et al. . |
| 4,961,670 | 10/1990 | McKenzie et al. . |
| 4,968,179 | 11/1990 | Frahm . |
| 4,971,225 | 11/1990 | Bravo . |
| 4,971,477 | 11/1990 | Webb et al. . |
| 5,002,428 | 3/1991 | Shettel . |
| 5,030,033 | 7/1991 | Heintzelman et al. . |
| 5,039,137 | 8/1991 | Cankovic et al. . |
| 5,040,408 | 8/1991 | Webb . |
| 5,054,794 | 10/1991 | Westhoff et al. . |
| 5,058,633 | 10/1991 | Sharp . |
| 5,060,509 | 10/1991 | Webb . |
| 5,062,457 | 11/1991 | Timmons . |
| 5,076,456 | 12/1991 | Geyer . |
| 5,085,257 | 2/1992 | Smith . |
| 5,098,221 | 3/1992 | Osborne . |
| 5,099,894 | 3/1992 | Mozeley, Jr. . |
| 5,105,966 | 4/1992 | Fort et al. . |
| 5,114,271 | 5/1992 | Sunderhaus et al. . |
| 5,117,877 | 6/1992 | Sharp . |
| 5,129,428 | 7/1992 | Winter et al. . |
| 5,129,684 | 7/1992 | Lawrence et al. . |
| 5,134,878 | 8/1992 | Sharp . |
| 5,150,927 | 9/1992 | Skinner . |
| 5,156,292 | 10/1992 | Ross . |
| 5,209,601 | 5/1993 | Odill et al. . |
| 5,211,695 | 5/1993 | Dowler ................................ 285/216 |
| 5,257,652 | 11/1993 | Lawrence . |
| 5,263,794 | 11/1993 | Webb . |
| 5,271,518 | 12/1993 | Webb . |
| 5,295,760 | 3/1994 | Rowe . |
| 5,297,896 | 3/1994 | Webb . |
| 5,318,480 | 6/1994 | Essi et al. ................................ 277/636 |
| 5,333,490 | 8/1994 | Webb . |
| 5,366,318 | 11/1994 | Brancher . |
| 5,372,453 | 12/1994 | Argandona . |
| 5,398,976 | 3/1995 | Webb . |
| 5,423,447 | 6/1995 | Youngs . |
| 5,431,457 | 7/1995 | Youngs . |
| 5,481,790 | 1/1996 | Koreis et al. . |
| 5,482,400 | 1/1996 | Bavington . |
| 5,490,419 | 2/1996 | Webb . |
| 5,501,472 | 3/1996 | Brancher et al. . |
| 5,690,368 | 11/1997 | Johnson ................................ 285/205 |
| 5,722,699 | 3/1998 | Brancher . |
| 5,810,400 | 9/1998 | Youngs ................................ 285/206 |

| | | |
|---|---|---|
| 5,826,919 | 10/1998 | Bravo .................................... 285/236 |

FOREIGN PATENT DOCUMENTS

| | | |
|---|---|---|
| 0944434 | 11/1948 | France . |
| 1496531 | 9/1967 | France . |
| 0951281 | 10/1956 | Germany . |
| 2253857 | 5/1973 | Germany . |
| 2226508 | 12/1973 | Germany . |
| 3016401 | 2/1981 | Germany . |
| 3-51430 | 3/1991 | Japan . |
| 0245418 | 6/1969 | Russian Federation . |
| 1352272 | 11/1987 | Russian Federation . |
| 0424638 | 5/1967 | Switzerland . |
| 0209931 | 1/1924 | United Kingdom . |
| 0595584 | 12/1947 | United Kingdom . |
| 0632756 | 12/1949 | United Kingdom . |
| 0667165 | 2/1952 | United Kingdom . |
| 1087178 | 10/1967 | United Kingdom . |
| 1144475 | 3/1969 | United Kingdom . |
| WO 90/04157 | 4/1990 | WIPO . |
| WO 90/07074 | 6/1990 | WIPO . |
| WO 93/17266 | 9/1993 | WIPO . |
| WO 95/09998 | 4/1995 | WIPO . |

OTHER PUBLICATIONS

Advanced Polymer Technology Inc., *APT Tech–Notes—Flexible Entry Boot Installation*, Issue 102 (Sep. 1993).

Total Containment Inc., *Multisided Tank Sumps* (Jul. 1, 1994).

Total Containment Inc., *Sump/Risers*.

Total Containment Inc., *Sump/Risers—Installation Instructions* (Apr. 15, 1989).

Total Containment Inc., *Sump/Riser Installation Instructions for Single Access Lids* (Nov. 23, 1992).

Total Containment Inc., *Enviroflex—Flexible Double–Wall Piping System* (Mar. 1, 1991).

Environ Products Inc., *Environ Safe Products—Designed for Future Generations* (1993).

Environ Products Inc., *Installation Instructions—Deep Burial Sumps* (Sep. 1, 1993).

DOUBLE BOOTED FLEXIBLE ENTRY BOOT

CROSS-REFERENCE TO RELATED APPLICATION

This application claims the benefit of U.S. Provisional Application Ser. No. 60/060,329, filed Sep. 29, 1997.

BACKGROUND OF THE INVENTION

The present invention relates generally to a fitting for a containment chamber and, more particularly, to a double booted flexible entry boot for providing a fluid-tight fitting between a wall of a fluid containment region and a conduit passing through the wall.

For many years in the area of fluid fittings, some structures have been of a permanent variety which include welding or bonding of the exterior wall of the conduit to the wall opening of the fluid containment region through which the conduit extends. Other structures, such as that disclosed in U.S. Pat. No. 4,775,073, disclose the use of a fitting system which is installed at a factory and then adapted by the user to fit his needs. Such manufacturing processes of fluid containment structures are limited since they require built-in fitting systems for which some users may not have any need, use and/or desire.

Moreover, many of these fitting structures require fixedly attaching the conduit at an angle perpendicular to the containment region wall. For example, U.S. Pat. Nos. 5,129,684; 4,775,073; 4,492,392; and 2,310,877 teach conduit fitting systems which require the conduit to be placed at an angle normal to the containment wall. If the angle is not normal, the fluid-tight seal will be breached. Such requirements greatly inhibit the use of the fitting system since a conduit cannot be inserted into the containment wall at angles which are other than normal while still maintaining a fluid-tight environment.

Thus, it is an object of the present invention to provide a fluid-tight entry boot for use with fluid-tight fitting systems, which boot has the advantage of easy installation for a user. It is a further object of the present invention to provide such an entry boot which has at least one sealing member substantially fully disposed within the containment region, which advantageously protects the sealing member from ground and weather exposure. It is yet a further object of the present invention to provide a flexible entry boot which may be repaired and/or replaced without water and/or fluid pouring into the containment region. Yet still further, it is an object of the present invention to provide such an entry boot which allows for the insertion of a conduit into a containment wall opening at angles which are not necessarily normal while maintaining a fluid-tight environment. Still further, it is an object of the present invention to provide such a fluid-tight system which is of simple construction and relatively easy and inexpensive to manufacture.

SUMMARY OF THE INVENTION

The present invention addresses and solves the above-mentioned problems and meets the enumerated objects and advantages, as well as others not enumerated, by providing a double booted flexible entry boot for providing a fluid-tight fitting between a wall of a fluid containment region and a conduit passing through the wall. The double booted flexible entry boot comprises two boots, one within the containment region, and one outside of the containment region. Each boot comprises a seal member and a screw securing plate mounted to the seal member. A flexibly rigid, cylindrical hollow support sleeve, integral with each seal member, has a degree of flexibility sufficient to allow for the insertion of the conduit at angles not necessarily equal to an angle normal to the fluid containment wall while maintaining a fluid-tight environment. Means are provided for releasably attaching each hollow support sleeve to the conduit. The entry boot further comprises means, carried by the securing plate outside the containment region, for releasably attaching the seal member within the containment region to the wall of the containment region. The seal member within the containment region may be repaired or replaced without substantial outside fluid invading the containment region.

BRIEF DESCRIPTION OF THE DRAWINGS

Other objects, features and advantages of the present invention will become apparent by reference to the following detailed description and drawings, in which.

DETAILED DESCRIPTION OF THE PREFERRED EMBODIMENTS

Figure 1:
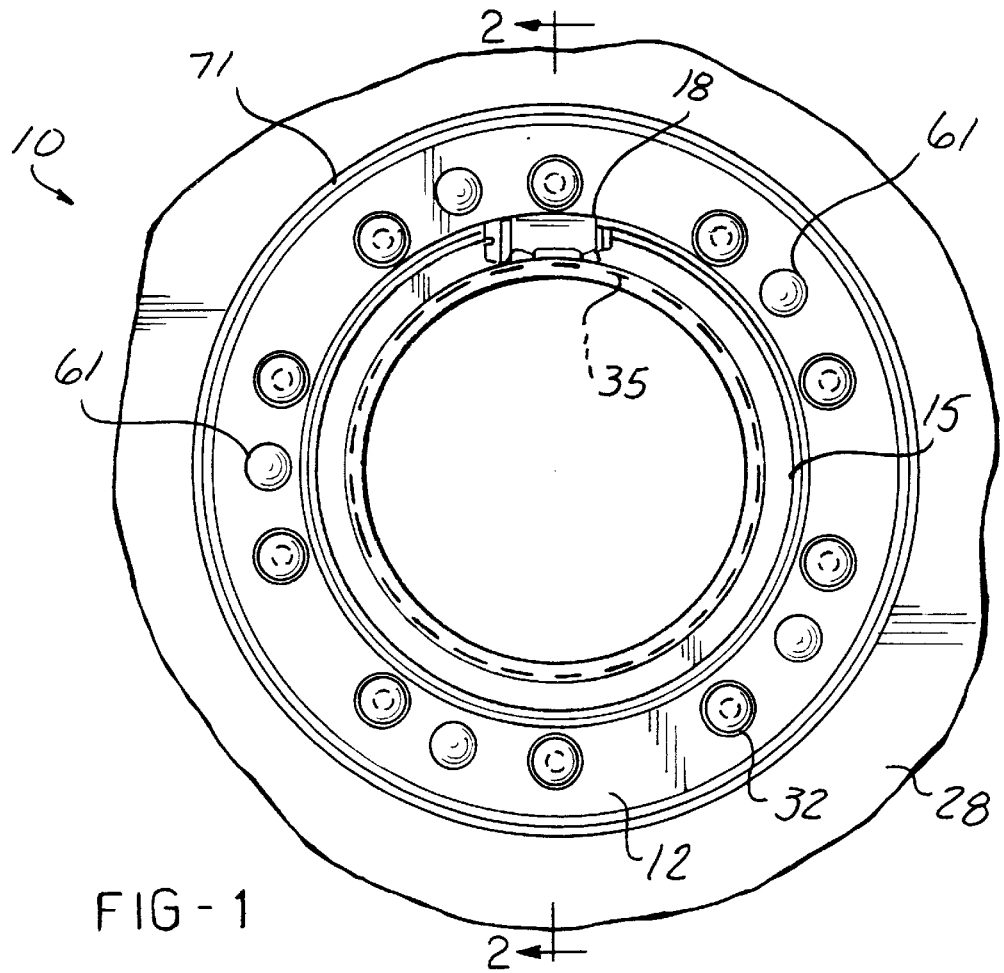
FIG. 1 is a view showing the outside of a fluid containment wall, with the double booted flexible entry boot of the present invention shown installed in the fluid containment wall which is broken away.
Figure 2:
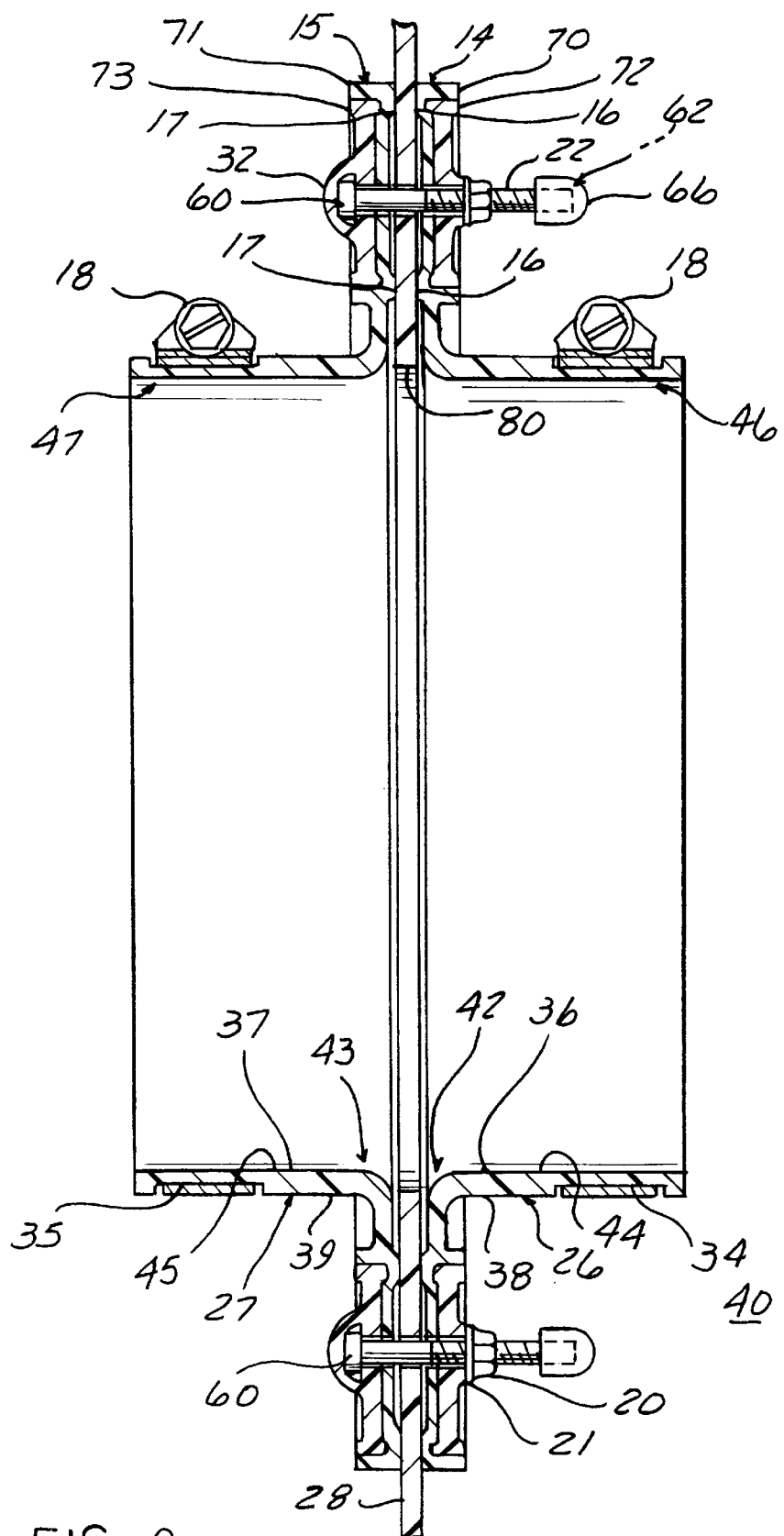
FIG. 2 is an enlarged cross-sectional view taken on line 2—2 of FIG. 1.
Figure 5:
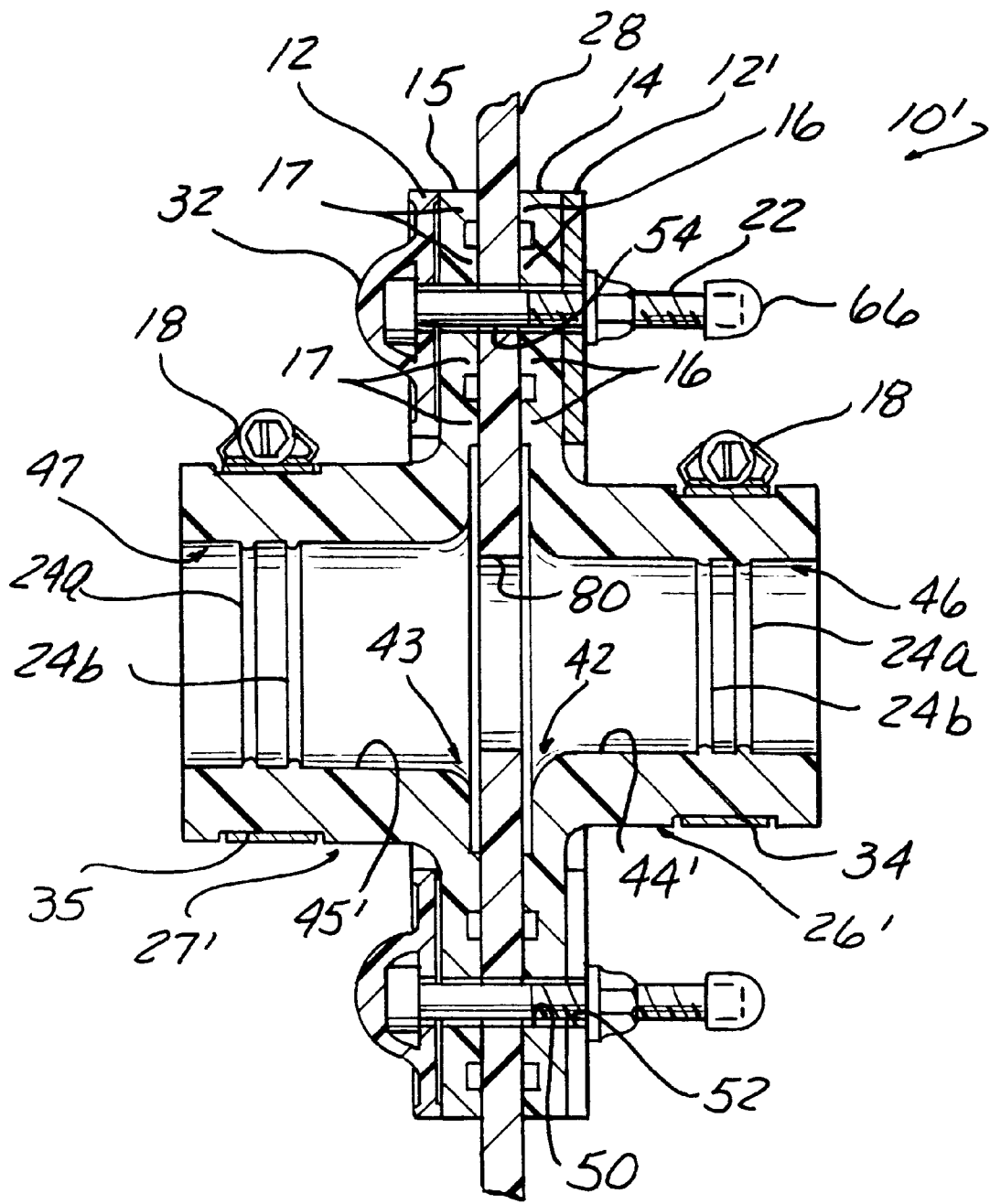
FIG. 5 is a view similar to FIG. 2, but showing a second embodiment of the present invention.

Referring now to FIGS. 1 and 2, the double booted flexible entry boot of the present invention is designated generally as 10. Entry boot 10 provides a fluid-tight fitting between a wall 28 of a fluid containment region 40 and a conduit (not shown) passing through wall 28. One of the novel and advantageous features of flexible entry boot 10 is that it has a boot both inside the containment region 40, and outside the containment region 40, as best seen in FIGS. 2 and 5.

Flexible entry boot 10 comprises a first seal member 14 disposed within containment region 40. First seal member 14 may also have sealing beads 16 integrally formed therewith and extending outwardly therefrom. However, it is to be understood that separate sealing washers, gaskets, or the like, may also be used. First seal member 14 may be formed of any suitable material, depending upon the particular requirements due to the fluid contained. Preferably, the seal member 14 will be formed from an oil and gas resistant material, or any other material which will be resistant to alcohols and hydrocarbons. More preferably, the seal member 14 is comprised of nitrile rubber and/or viton rubber, thermoplastic elastomers or epichlorohydrin rubber. One suitable seal member 14 material which is preferable is a thermoplastic elastomer commercially available under the trade name ALCRYN from E.I. du Pont de Nemours Company. Further, seal member 14 may be of any suitable shape and size, depending upon the manufacturer and particular end use. In the preferred embodiment, the seal member 14 is circular.

Flexible entry boot 10 further comprises a second seal member 15 disposed outside of containment region 40. Second seal member 15 may also have sealing beads 17 integrally formed therewith and extending outwardly therefrom. However, it is to be understood that separate sealing washers, gaskets, or the like, may also be used. Second seal member 15 may be formed of any suitable material, as stated above in relation to first seal member 14. One suitable seal member 15 material which is preferable is a thermoplastic elastomer commercially available under the trade name ALCRYN from E.I. du Pont de Nemours Company. Further, seal member 15 may be of any suitable shape and size, depending upon the manufacturer and particular end use. In the preferred embodiment, the seal member 15 is circular, as shown in FIG. 1.

Flexible entry boot 10 may further comprise two screw securing plates 12, one attached to and/or mountable to seal member 14; and the other attached to and/or mountable to seal member 15. Similarly, these screw securing plates 12 may also be of any desired size and shape and of any suitable material. In the preferred embodiment, the screw securing plates 12 are circular and are formed from a suitably rigid material.

In the embodiments shown in FIGS. 1–4 and 6, the plates 12 are formed from a suitably rigid, yet somewhat flexible polymeric material. One such preferred material is an acetal material commercially available under the trade name CELCON from Hoechst Celanese Co. One alternate preferred material is a glass filled nylon material. One of the advantages of using a flexibly rigid polymeric material as opposed to a metallic material is that if there is a degree of curvature at the point on the containment wall 28 surface at which the boot 10 is attached, the flexibly rigid polymeric material comprising the plate 12 may more easily flex and flatten against the surface of the wall 28, giving rise to an enhanced fluid tight seal.

In the second embodiment shown in FIG. 5, boot 10' includes plate 12 formed from a flexibly rigid polymeric material; while plate 12' is formed from a suitably rigid metal material. It is to be understood that any and/or all of the embodiments of the boot 10, 10', 10" disclosed hereinabove and hereinbelow may have one or both screw securing plates 12 be formed from a flexibly rigid polymeric material as described above; and/or from a suitably rigid metal material; as well as any combination of flexibly rigid polymeric and metal material, as in for example, the metal plate 12'/plastic plate 12 combination of FIG. 5.

Referring again to FIG. 2, flexibly rigid, cylindrical hollow support sleeves 26, 27 have a degree of flexibility sufficient to allow for the insertion of the conduit at angles less than or equal to a 90° angle, i.e. the conduit does not need to be inserted precisely perpendicular to the containment wall 28 in order to maintain a fluid-tight environment, and has a degree of flexion such that if moved after fitted, the fluid-tight environment remains intact. The amount of flexion may be any suitable desired amount, however, in the preferred embodiment, the hollow sleeve 26, 27 provides for up to approximately a 30° offset from normal (90°) in any direction.

Flexible entry boot 10 further comprises a first hollow sleeve 26 having a first open end portion 42 integrally attached to seal member 14, first open portion 42 having a central throughbore 44 in fluid communication with hollow support sleeve 26. Sleeve 26 has a second open end portion 46 opposed to, and integrally attached to first open portion 42, with first open portion 42 adapted to flexibly receive a conduit, and second open portion 46 adapted to releasably hold the conduit in place. It is to be understood that hollow support sleeve 26 may be formed in any suitable shape and of any suitable material, and may provide any degree of flexion as necessitated by the particular manufacturer and end use, as long as such choices serve the objects and advantages of the present invention as set forth hereinabove.

Flexible entry boot 10 further comprises a second hollow sleeve 27 having a first open end portion 43 integrally attached to seal member 15, first open portion 43 having a central throughbore 45 in fluid communication with hollow support sleeve 27. Sleeve 27 has a second open end portion 47 opposed to, and integrally attached to first open portion 43, with first open portion 43 adapted to flexibly receive a conduit, and second open portion 47 adapted to releasably hold the conduit in place. As with support sleeve 26, it is to be understood that hollow support sleeve 27 may be formed in any suitable shape and of any suitable material, and may provide any degree of flexion as necessitated by the particular manufacturer and end use, as long as such choices serve the objects and advantages of the present invention as set forth hereinabove. Central throughbores 44 and 45 are in fluid communication with a bore 80 extending through the containment wall 28.

It is preferable, for ease in manufacturing and installation, as well as for optimum fluid tight fittings, that the sleeve 26 be integrally molded with seal member 14, and that sleeve 27 be integrally molded with seal member 15. However, it is to be understood that sleeves 26, 27 and seal members 14, 15 may be formed and/or connected by any suitable method (s).

Means are provided for releasably attaching hollow support sleeves 26 and 27 to the conduit. It is to be understood that this releasable conduit attaching means may comprise any suitable means. However, in the preferred embodiment, this conduit attaching means comprises a hose clamp 18.

Figure 3:
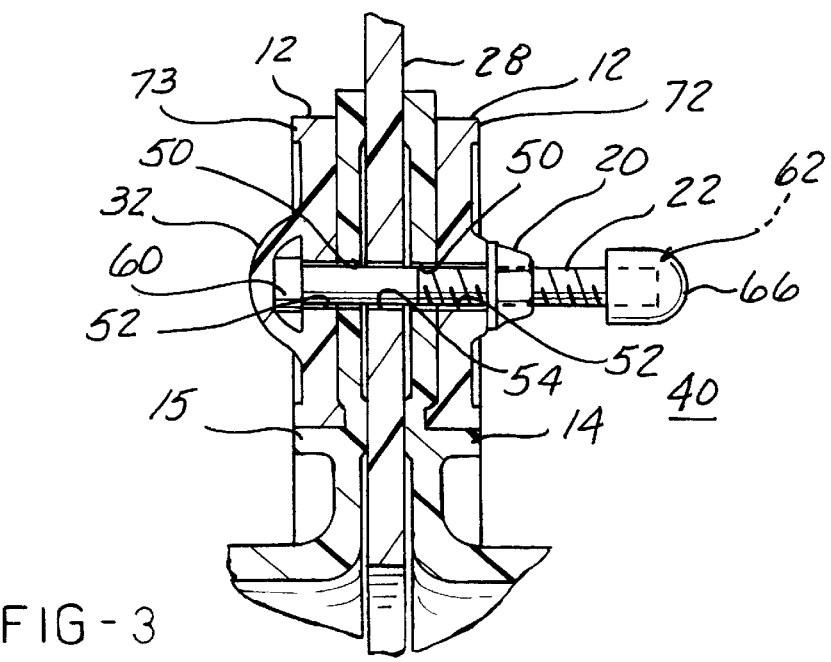
FIG. 3 is an enlarged cutaway cross-sectional view, similar to the upper portion of the view of FIG. 2, but showing an alternate embodiment of the seal member and screw securing plate.

Flexible entry boot 10 further comprises means, extending from outward containment region 40 thereinto, for releasably attaching seal member 14 to wall 28 of containment region 40 and in turn to seal member 15. It is to be understood that this seal member attaching means may comprise any suitable means. However, in the preferred embodiment, this attaching means comprises a plurality of screw 22 and nut 20 assemblies, as best seen in FIG. 3. Although optional, it is preferred that the nuts 20 be used with a washer 21, and even more preferred is that the washer 21 have outwardly extending gripping ridges (not shown) on the load bearing surface (ie. the surface confronting plate 12); and that the washer 21 be integrally formed with the nut 20.

Although ten screw 22 and nut 20 assemblies are shown in FIG. 1, it is to be understood that any suitable number may be used. Generally, the smaller diameter the conduit, the smaller diameter the seal members 14, 15 are—see, for example, the embodiment shown in FIG. 5. Further, the smaller seal members 14, 15 are, the fewer screw 22 and nut 20 assemblies are generally necessary. For illustrative, non-limitative purposes, a ½", ¾" and 1" conduit may use seal members 14, 15 having four screw 22 and nut 20 assemblies; while a 1½", 2" or larger conduit may use seal members 14, 15 having eight, ten or more screw 22 and nut 20 assemblies.

The screw and nut assemblies may be any conventionally known assemblies, and further, it is to be understood that any known and suitable fastening means may be used. In the preferred embodiment, the seal member attaching means may further comprise a screw cap-like end portion 32 tightly surrounding and conforming to an end 60 portion of each screw 22. Any suitable screw may be used, however, in the preferred embodiment, as can best be seen in FIGS. 3–6, the head of end portion 60 comprises the head of a socket head cap screw. Screw 22 may also comprise a flanged washer hex head cap screw with a screwdriver slot (not shown); a ¼-20×2 HW 2132 stainless steel weld stud; a conventional bolt; and/or a press-fit stud.

As can clearly be seen in FIG. 3, nut 20 is attached at a screw end 62 opposite the end 60 at which screw cap-like end portion 32 is disposed. Screw cap-like end portions 32, in that they are exposed to the surrounding soil or other environment, are preferably formed from a suitable corrosion resistant material. It is to be understood that any suitable material may be used. However, in the preferred embodiment, screw cap-like end portions 32 and the screw securing plate 12 which is disposed outside of the containment region 40 (as seen in FIG. 1, and as seen at the left side of FIG. 2) are integrally formed and/or molded from the suitably rigid, yet somewhat flexible polymeric material, such as the acetal material described hereinabove. As can be seen, the end portion 60 of screw 22 is also integrally molded within that outer plate 12 into a one-piece unit. Although it is preferred that the above be a one-piece unit, it is to be understood that the screw cap-like end portions 32, the screw securing plate 12 and the screw 22 may remain as separate pieces, simply mounted together by suitable fasteners during installation into the containment wall 28.

The seal members 14, 15 may also be molded and/or integrally formed with their respective adjacent screw securing plates 12. The molding attachment plugs 61, which are one example of a means for molding the seal members 14, 15 to the plates 12, are shown in FIG. 1. Although it is preferred that the seal members 14, 15 be integrally formed with the plates 12, it is to be understood that the seal members may remain as separate pieces from the plates 12, if desired.

Among the many advantages of forming screw cap-like end portions 32, the screw securing plate 12, and the end portion 60 of screw 22 as an integral piece are the following. The boot 10 becomes easier and less expensive to manufacture and install, given the fewer number of separate parts. Further, the fluid-retaining integrity of boot 10 may be enhanced by having a one-piece screw securing plate/screw cap-like end portion/screw head end portion unit, in that there are fewer possible gaps through which fluid may leak. In addition, for similar reasons, it may also be advantageous to mold the respective screw securing plates 12 to the seal members 14, 15.

As best seen in FIG. 3, each of seal members 14, 15 include a plurality of bores 50 extending transversely through each of seal members 14, 15 for inserting the seal member-to-containment wall attaching means. Screw securing plate 12 includes a plurality of apertures 52. Containment wall 28 also contains a plurality of bores 54. The wall bores 54, plate apertures 52 and seal bores 50 are all in corresponding relation one to the other. Any size and number of seal bores 50 and plate apertures 52 may be used. However, in the preferred embodiment, the seal member bores 50 are disposed evenly around seal member 14, as best seen in FIG. 1. Correspondingly, the screw plate apertures 52 are disposed evenly about screw plate 12.

First hollow sleeve 26 has an outer surface 38 and an inner, conduit receiving surface 36. Hollow sleeve 26 may further comprise an annular groove 34, disposed on outer surface 38 of support sleeve 26, for receiving the support sleeve-to-conduit attaching means. As best seen in FIG. 2, this annular groove 34 is releasably receiving hose clamp 18. In an alternate preferred embodiment, hollow sleeve 26 may further comprise two annular projections (not shown), disposed on, and preferably integrally formed in outer surface 38 of support sleeve 26, for receiving therebetween the support sleeve-to-conduit attaching means. These annular projections are adapted to releasably receive hose clamp 18.

Similarly, second hollow sleeve 27 has an outer surface 39 and an inner, conduit receiving surface 37. Hollow sleeve 27 may further comprise an annular groove 35, disposed on outer surface 39 of support sleeve 27, for receiving the support sleeve-to-conduit attaching means. As best seen in FIG. 2, this annular groove 35 is releasably receiving hose clamp 18. Hollow sleeve 27 may alternately further comprise the two annular projections as described above (not shown), disposed on, and preferably integrally formed in outer surface 39 of support sleeve 27, for receiving therebetween the support sleeve-to-conduit attaching means. These annular projections are adapted to releasably receive hose clamp 18.

As seen in FIG. 5, each of hollow support sleeves 26, 27 may further comprise at least one gripping flange 24a disposed on the inner, conduit receiving surface. Each of hollow support sleeves 26, 27 may further comprise a second gripping flange 24b.

Also shown in FIG. 5 is an optional embodiment of the hollow support sleeves, generally designated as 26' and 27'. As can be seen, the central throughbore 44' has a slightly lesser diameter than the central throughbore 45'. It is believed that this diameter differential may be advantageous in that, when a conduit is inserted from outside the containment region 40 through central bore 45' and then through central bore 44', the slightly greater diameter of bore 45' may prevent drag on the pipe. This may make the conduit easier to install, as well as insuring a fluid tight fitting.

Figure 4:
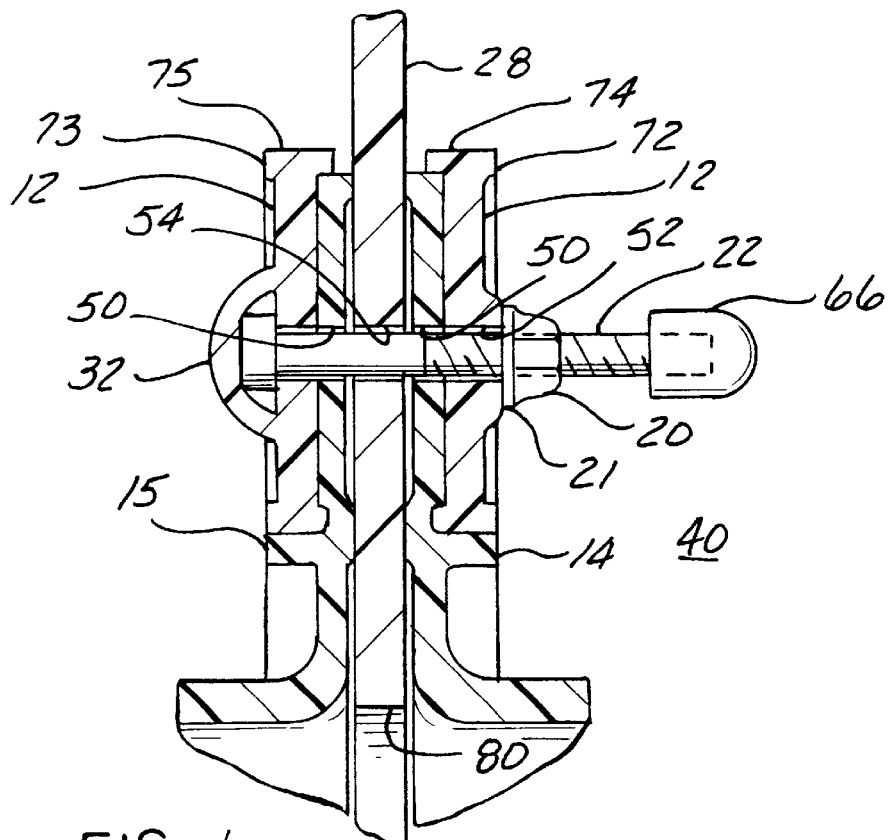
FIG. 4 is a view similar to FIG. 3, showing a further alternate embodiment of the seal member and screw securing plate.

Three alternate preferred embodiments of the seal members 14, 15 and the screw securing plates 12 are shown in FIGS. 2–4. In FIGS. 1 and 2, each of the seal members 14, 15 at their outermost edges have an outwardly extending annular lip 70, 71 which closely surrounds the outer circumferential edge 72, 73 of each screw securing plate 12.

In FIG. 3, the outermost edges of each of the seal members 14, 15 are substantially even with the outer circumferential edge 72, 73 of each screw securing plate 12.

In FIG. 4, the outer circumferential edge 72, 73 of each screw securing plate 12 includes an inwardly extending annular lip 74, 75 which closely surrounds the outermost edges of each of the seal members 14, 15. In this embodiment, it is to be understood that lips 74, 75 should preferably extend about ⅓ to about ½ of the thickness of the outermost edges of each of the seal members 14, 15 (as shown). It is believed that if lips 74, 75 extended significantly further, they may prevent compression of seal members 14, 15, thereby compromising the fluid tight seal to the wall 28 of fluid containment region 40.

A further alternate embodiment (not shown) includes the outer circumferential edge 72, 73 of each screw securing plate 12 extending outwardly past the outermost edges of each of the seal members 14, 15, as shown in FIG. 4, but without any lips 74, 75.

It is to be understood that any and/or all of the above alternate embodiments of the seal members 14, 15 and the screw securing plates 12 may be used in any combination for any boot 10, 10', 10". Although the same embodiment is shown for each seal member 14, 15 shown in FIGS. 2–4, it is to be understood that any combination may be used. For example, in one embodiment of a boot 10, the seal member 14/edge 72 may comprise the embodiment of FIG. 2; while the seal member 15/edge 73 may comprise the embodiment of FIG. 4, and vice verse. This is just one exemplary combination of the many variations which may exist. Each of the above alternate embodiments of the seal members 14, 15 and the screw securing plates 12 perform well to provide a fluid tight fitting; however, some may perform better in certain installations than another. As such, it is contemplated that a particular embodiment will be chosen as desired, depending upon the manufacturer and/or the particular end use.

Figure 6:
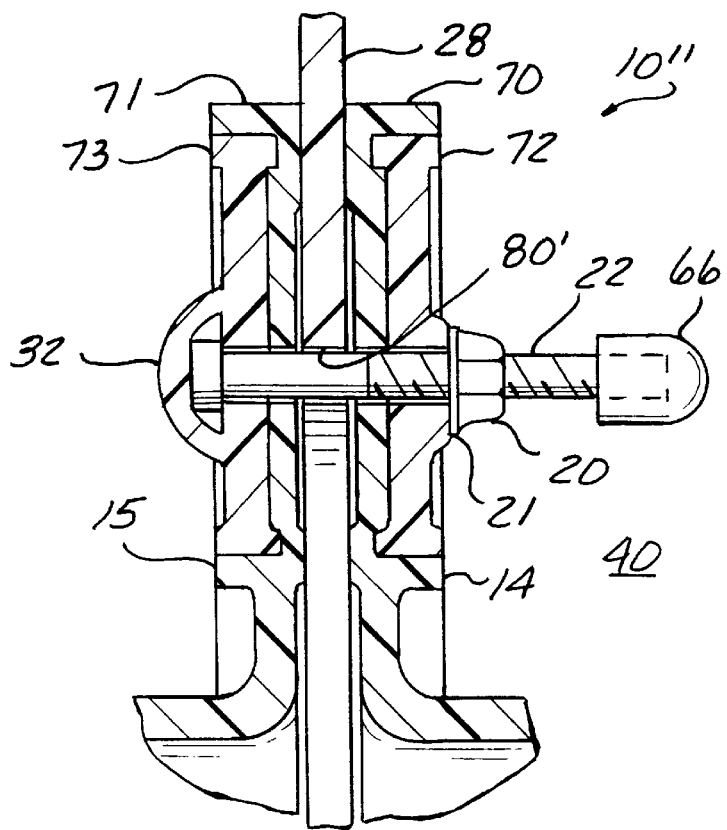
FIG. 6 is a view similar to FIG. 3, but showing a third embodiment of the present invention.

A third embodiment of the boot 10" is shown in FIG. 6. In this embodiment, only a larger bore 80' extends through the containment wall 28; there is no necessity for the plurality of bores 54 through containment wall 28. Each of the screw 22 and nut 20 assemblies are fastened through larger bore 80'. The width of the seal members 14, 15 extending circumferentially outwardly from the bores 50; as well as the width of the screw securing plates 12 extending circumferentially outwardly from the bores 52 is greater than the corresponding widths shown in the embodiments of FIGS. 1–5. These greater widths enhance the fluid tight seal against the containment wall 28, to accommodate the lack of individual bores 54. This embodiment is particularly advantageous from an installation viewpoint—since only one bore 80 needs to be drilled through wall 28, it is faster, more precise, and there is a lesser likelihood of mistakes, in that there is no need to precisely and properly align bores 54 in wall 28 to correspond to bores 50 and 52.

Flexible entry boot 10 may also further comprise a protective cap or cover 66 over the end 62 of screw 22. It is to be understood that cover 66 may be formed in any suitable size and of any suitable material, such as nylon, acetal, polypropylene, polyethylene or rubber.

The flexible entry boot 10, 10', 10" as described hereinabove achieves, but is not limited to, the objects and advantages described more fully above. It is believed that the present double booted flexible entry boot 10 is a vast improvement over conventionally available fluid fittings, in that boot 10 is still simple to manufacture and install, while at the same time providing approximately twice the amount of fluid tight sealing capabilities in comparison to single booted entry boots. Another particular advantage with the boot 10 of the present invention is that the boot inside the containment region 40 (including seal member 14, plate 12, sleeve 26, etc.) may be repaired and/or replaced without water and/or fluid pouring into the containment region 40, since the water/fluid will be held back by the boot outside of the containment region 40 (including seal member 15, plate 12, sleeve 27, etc.).

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A double booted flexible entry boot for providing a fluid-tight fitting between a wall of a fluid containment region and a conduit passing through the wall, the flexible entry boot comprising:

an inner seal member adapted to be disposed within the containment region;

a first securing plate, adapted to be disposed within the containment region and mounted to the inner seal member;

a first, hollow support sleeve extending outwardly from the inner seal member, the first support sleeve having an outer surface and an inner, conduit receiving surface, the first hollow support sleeve further having a degree of flexibility sufficient to allow for the insertion of the conduit at angles normal to or other than an angle normal to the fluid containment wall while maintaining a fluid-tight environment;

means for releasably attaching the first hollow support sleeve to the conduit;

an outer seal member adapted to be disposed outside of the containment region;

a second securing plate, adapted to be disposed outside of the containment region and mounted to the outer seal member;

a second, hollow support sleeve extending outwardly from the outer seal member and oppositely from the first hollow support sleeve, the second support sleeve having an outer surface and an inner, conduit receiving surface, the second hollow support sleeve further having a degree of flexibility sufficient to allow for the insertion of the conduit at angles normal to or other than an angle normal to the fluid containment wall while maintaining a fluid-tight environment;

means for releasably attaching the second hollow support sleeve to the conduit; and means, carried by the second securing plate, for releasably attaching the inner seal member to the wall of the containment region;

wherein the inner seal member may be repaired or replaced without substantial outside fluid invading the containment region.

2. The double booted flexible entry boot as defined in claim 1 wherein each of the seal members is integrally molded with its respective securing plate.

3. The double booted flexible entry boot as defined in claim 1 wherein each of the seal members is substantially circular-shaped, and is corrosion resistant and oil and gas resistant.

4. The double booted flexible entry boot as defined in claim 3 wherein each of the seal members is formed from nitrile rubber.

5. The double booted flexible entry boot as defined in claim 1 wherein each of the seal members has a plurality of bores extending transversely therethrough, the bores disposed evenly around each of the seal members.

6. The double booted flexible entry boot as defined in claim 1 wherein each of the securing plates is annular, and wherein each of the hollow support sleeves is cylindrical.

7. The double booted flexible entry boot as defined in claim 5 wherein each of the securing plates is a screw securing plate having a plurality of apertures disposed evenly therearound and in corresponding relation to the seal member bores.

8. The double booted flexible entry boot as defined in claim 1 wherein each of the hollow support sleeve-to-conduit attaching means comprises a hose clamp, receivable about the support sleeve outer surface.

9. The double booted flexible entry boot as defined in claim 7 wherein the inner seal member-to-containment wall attaching means comprises a plurality of screw and nut assemblies extending from outward the containment region thereinto, and wherein each screw has a head.

10. The double booted flexible entry boot as defined in claim 9 wherein the second securing plate receives each of the plurality of screws adjacent its head.

11. The double booted flexible entry boot as defined in claim 10 wherein each of the securing plates is formed from acetal, and wherein the second securing plate is integrally molded with each of the plurality of screw heads.

12. The double booted flexible entry boot as defined in claim 1 wherein the first support sleeve has an inner, conduit receiving bore having a first diameter, and the second support sleeve has an inner, conduit receiving bore having a second diameter, and wherein the second diameter is slightly greater than the first diameter.

13. A double booted flexible entry boot for providing a fluid-tight fitting between a wall of a fluid containment region and a conduit passing through the wall, the flexible entry boot comprising:
   an inner seal member adapted to be disposed within the containment region;
   a first securing plate, adapted to be disposed within the containment region and integrally molded with the inner seal member;
   a first, hollow support sleeve extending outwardly from the inner seal member, the first support sleeve having an outer surface and an inner, conduit receiving surface, the first hollow support sleeve further having a degree of flexibility sufficient to allow for the insertion of the conduit at angles normal to or other than an angle normal to the fluid containment wall while maintaining a fluid-tight environment;
   means for releasably attaching the first hollow support sleeve to the conduit;
   an outer seal member adapted to be disposed outside of the containment region;
   a second securing plate, adapted to be disposed outside of the containment region and integrally molded with the outer seal member;
   a second, hollow support sleeve extending outwardly from the outer seal member and opposedly from the first hollow support sleeve, the second support sleeve having an outer surface and an inner, conduit receiving surface, the second hollow support sleeve further having a degree of flexibility sufficient to allow for the insertion of the conduit at angles normal to or other than an angle normal to the fluid containment wall while maintaining a fluid-tight environment;
   means for releasably attaching the second hollow support sleeve to the conduit; and
   means, carried by the second securing plate, for releasably attaching the inner seal member to the wall of the containment region;
   wherein the inner seal member may be repaired or replaced without substantial outside fluid invading the containment region.

14. The double booted flexible entry boot as defined in claim 13 wherein each of the seal members is formed from nitrile rubber and has a plurality of bores extending transversely therethrough, the bores disposed evenly around the seal member, and wherein each of the securing plates is a screw securing plate formed from acetal and having a plurality of apertures disposed evenly therearound and in corresponding relation to the seal member bores.

15. The double booted flexible entry boot as defined in claim 14 wherein the inner seal member-to-containment wall attaching means comprises a plurality of screw and nut assemblies extending from outward the containment region thereinto, each screw having an end region including its head, and wherein the second securing plate and the end regions are integrally formed into a unitary member.

16. The double booted flexible entry boot as defined in claim 13 wherein the first support sleeve has an inner, conduit receiving bore having a first diameter, and the second support sleeve has an inner, conduit receiving bore having a second diameter, and wherein the second diameter is slightly greater than the first diameter.

17. A fluid containment system having a flexible entry boot for providing a fluid-tight fitting between a wall of a fluid containment region and a conduit passing through the wall, the flexible entry boot comprising:
   an inner seal member disposed within the containment region;
   a first securing plate, disposed within the containment region and mounted to the inner seal member;
   a first, hollow support sleeve extending outwardly from the inner seal member, the first support sleeve having an outer surface and an inner, conduit receiving surface, the first hollow support sleeve further having a degree of flexibility sufficient to allow for the insertion of the conduit at angles normal to or other than an angle normal to the fluid containment wall while maintaining a fluid-tight environment;
   means for releasably attaching the first hollow support sleeve to the conduit;
   an outer seal member disposed outside of the containment region;
   a second securing plate, disposed outside of the containment region and mounted to the outer seal member;
   a second, hollow support sleeve extending outwardly from the outer seal member and opposedly from the first hollow support sleeve, the second support sleeve having an outer surface and an inner, conduit receiving surface, the second hollow support sleeve further having a degree of flexibility sufficient to allow for the insertion of the conduit at angles normal to or other than an angle normal to the fluid containment wall while maintaining a fluid-tight environment;
   means for releasably attaching the second hollow support sleeve to the conduit; and
   means, carried by the second securing plate, for releasably attaching the inner seal member to the wall of the containment region;
   wherein the inner seal member may be repaired or replaced without substantial outside fluid invading the containment region.

18. The fluid containment system as defined in claim 17 wherein each of the seal members has a plurality of bores extending transversely therethrough, the bores disposed evenly around the seal member, and wherein each of the securing plates is a screw securing plate having a plurality of apertures disposed evenly therearound and in corresponding relation to the seal member bores.

19. The fluid containment system as defined in claim 18 wherein the inner seal member-to-containment wall attaching means comprises a plurality of screw and nut assemblies extending from outward the containment region thereinto, each screw having an end region including its head, and wherein the second securing plate and the end regions are integrally formed into a unitary member.

20. The fluid containment system as defined in claim 19 wherein the first support sleeve has an inner, conduit receiving bore having a first diameter, and the second support sleeve has an inner, conduit receiving bore having a second diameter, and wherein the second diameter is slightly greater than the first diameter.

* * * * *